3,833,554
METHOD OF PURIFYING α-L-ASPARTYL-L-PHENYLALANINE LOWER ALKYL ESTERS OF PEPTIDE IMPURITIES

Yasuo Ariyoshi and Koji Toi, Yokohama, Japan, assignors to Ajinomoto Co., Inc., Tokyo, Japan
No Drawing. Filed May 16, 1973, Ser. No. 360,673
Claims priority, application Japan, May 25, 1972, 47/51,985
Int. Cl. A23l 1/26; C07c 103/52
U.S. Cl. 260—112.5                                    5 Claims

ABSTRACT OF THE DISCLOSURE

α-L-Aspartyl-L-phenylalanine lower alkyl esters can be purified of accompanying, chemically closely similar peptides by passing their aqueous solutions at pH 4–6 over a column of a strong-base anion exchange resin in the weak organic acid ion form, commercially available resins in the acetate and formate form which retains the impurities being illustrated. The desired esters are recovered from the effluent in yields closely approaching 100%.

---

This invention relates to the purification of α-L-aspartyl-L-phenylalanine lower alkyl esters, and particularly to the separation of the esters in practically pure state from accompanying, chemically closely similar peptide impurities.

The lower alkyl esters of α-L-aspartyl-L-phenylalanine, hereinafter referred to as α-APE for brevity, which have 1 to 4 carbon atoms in the alkyl group, have a taste closely resembling that of cane sugar (Pat. No. 3,492,131) and are valuable sugar substitutes. They are prepared in good yields from the corresponding esters of phenylalanine by direct condensation with strong acid salts of L-aspartic anhydride, such as the hydrochloride, the hydrobromide, or the benzenesulfonate.

The reaction product may contain small amounts of tripeptide esters such as α- and β-L-aspartyl-α-L-aspartyl-L-phenylalanine lower alkyl esters and the tripeptides resulting from hydrolysis of the esters. The main by-product is β-L-aspartyl-L-phenylalanine lower alkyl ester and is readily removed without signficantly reducing the amounts of tripeptide esters and tripeptides present.

When other methods are employed for producing the lower-alkyl esters of α-L-aspartyl-L-phenylalanine, the desired product may be accompanied by unreacted starting materials and such by-products as α-L-aspartyl-L-phenylalanine and cyclo-α-L-aspartyl-L-phenylalanyl.

Many of these impurities are so closely related to the desired α-APE as to form mixed crystals therewith, and are generally difficult to remove. Yet, they unfavorably affect the properties of the α-APE.

It has now been found that only the impurities mentioned above are removed selectively from an aqueous solution of contaminated α-APE contacted with a strong-base ion exchange resin in the weak organic acid ion form, and that the α-APE are not retained by the resin in significant amounts at pH 4.0 to 6.0. The acetic acid and formic acid ion forms of the resins are preferred since they do not affect the taste of the desired product and formic and acetic acid are acceptable in goods in the quantities involved.

The impurities mentioned above have isoelectric points lower than those of the α-APE, and the latter are neither adsorbed nor decomposed or modified to a significant extent under the conditions of this method, although they are readily hydrolyzed to α-L-aspartyl-L-phenylalanine or converted to cyclo-α-L-aspartyl-L-phenylalanyl by contact with bases. Contact with the OH forms of strong-base ion exchange resins or of weak-base ion exchange resins in an aqueous medium converts the α-APE largely to α-L-aspartyl-L-phenylalanine and to cyclo-α-L-aspartyl-L-phenylalanyl.

The α-APE are capable of being adsorbed by strong-acid cation exchange resins in the H form or Na form and thereby separated from the afore-mentioned impurities, but the α-APE cannot be eluted even by means of 1-N hydrochloric acid. Other types of ion exchange resins adsorb neither the α-APE nor the impurities in useful amounts.

The strong-base anion exchange resins in the weak organic acid form are the only ion exchange resins which permit purification of the relatively unstable dipeptide esters from closely related impurities without damaging the desired product.

The aqueous solution of the contaminated α-APE need not contain pure water as the sole liquid constituent. Water-soluble or water-miscible, inert organic solvents may be present without affecting the result. Such solvents include methanol, ethanol, propanol, ethyleneglycol, isobutyleneglycol, acetone, methylethylketone, diethylketone, tetrahydrofuran, dioxane, acetonitrile, dimethylformamide, dimethylsulfoxide, and γ-butyrolactone.

The optimum pH value of the aqueous solution varies somewhat with the temperature and the amount and kind of impurities. Generally, the pH value should be at least 4.0, and it is preferably higher than 4.5. At a pH of more than 6.0, the α-APE tend to decompose and some of the α-APE originally present is lost by adsorption on the resin. It is generally safe to operate at a pH below 5.5.

At pH 4.0 to 6.0, the tripeptide esters, tripeptides, cyclo-α - L - aspartyl - L - phenylalanyl, α-L-aspartyl-L-phenylalanine, and the like are practically completely adsorbed by the resin.

Any strong-base anion exchange resin in the weak organic acid form may be employed in the method of this invention. They include the Dowex Type 1 and Type 2 strong-base anionic ion exchange resins which have polystyrene chains carrying trimethylammonium radicals or β-hydroxyethyldimethylammonium radicals bound to the benzene rings by a methylene group, and analogous resins available commercially from many suppliers.

The resins should have an exchange capacity at least equivalent to the impurities present, but they are most effective when employed in amounts which provide excess exchange capacity, an excess of at least 100% being preferred. A very small amount of the α-APE is adsorbed by the resin, and too large an amount of resin reduces the yield of the desired product. The resin, therefore, should preferably not be employed in amounts which provide more than ten times the exchange capacity needed for the impurities present.

The contact between the aqueous solution of contaminated α-APE and the anion exchange resin may be established in any known manner. A tube or column may be packed with resin particles, or the resin may be kept suspended in a batch of the solution by stirring. The temperature at the time of contact is not critical as long as it does not cause decomposition of the ester or of the resin. Temperatures of 0° to 100° C., at which water is normally liquid, are generally satisfactory, and it is most convenient to operate at temperatures between 15° and 60° C.

The α-APE have only limited solubility in water, and are thus readily precipitated in crystalline form from the purified aqueous solution. Depending on the initial temperature and/or concentration of the solution, partial evaporation and/or cooling may be resorted to induce crystallization.

The resin may be regenerated by eluting the adsorbed impurities by means of hydrochloric acid, sodium chloride, ammonia, sodium hydroxide, and other acids, bases, or neutral salts, and restored to thereafter its original ionic form by means of the weak organic acid desired.

The purified solution may be analyzed for its α-APE and impurities content by paper electrophoresis of an aliquot in an aqueous acetic acid solution at pH 2.77 and 40 v./cm. followed by staining with ninhydrin-cadmium reagent (J. Heilmann et al., Z. Physiol. Chem. *309* [1957] 219). The spots corresponding to the separated compounds are excised and extracted with methanol, and the methanol solution subjected to colorimetric determination at a wavelength of 510 mμ.

Cyclo - α - L - aspartyl-L-phenylalanyl does not give a color reaction with ninhydrin and can be determined by thin-layer chromatography. The chromatogram is chlorinated and stained with potassium iodide—starch reagent (Y. Ariyoshi et al., Bull. Chem. Soc. Japan *44* [1971] 2558), and the color produced is matched to that of a known sample.

The following Examples are further illustrative of this invention.

EXAMPLE 1

A cylindrical glass tube, 1 cm. in diameter, was packed with 20 ml. Dowex 1-X4, a strong-base ion exchange resin whose ion exchange properties are determined by a quaternary ammonium functionality in which the substituents on the nitrogen atom are a polymeric benzyl group and three methyl groups, and which contains 4% divinylbenzene. The resin was in the acetate form.

A solution of 24.0 g. α - L - aspartyl - L-phenylalanine methyl ester (hereinafter referred to as α-APM) and 2.0 g. α - L - aspartyl-α-L-aspartyl-L-phenylalanine methyl ester (hereinafter referred to as α-AAPM) in 800 ml. water and having a pH of 5.0 was passed slowly through the packed tube at 50° C., and the resin thereafter was washed with 40 ml. water.

An aliquot of the combined effluent was analyzed by paper electrophoresis and found to contain 23.2 g. α-APM (96.6% yield). It was free from traces of α-AAPM capable of being detected by means of ninhydrin staining.

The bulk of the liquid mixture was evaporated to 500 ml., and the concentrate was stored overnight in a refrigerator. Pure, crystalline α-APM was precipitated and was recovered in an amount of 18.6 g. (75.5% yield).

EXAMPLE 2

A solution prepared from 24 g. α-APM, 0.7 g. α-AAPM, 0.5 g. β - L - aspartyl-α-L-aspartyl-L-phenylalanine methyl ester (β-AAPM) and 0.14 g. sodium chloride in 800 ml. water and having a pH of 4.9 was treated in the manner described in Example 1.

The combined effluent was found to contain 22.6 g. α-APM, none of the α-AAPM or β-AAPM, and 19.4 g. pure, crystalline α-APM was recovered by partial evaporation and cooling.

EXAMPLE 3

A solution of 24 g. α-APM, 0.7 g. α-AAPM, 0.5 g. α-L-aspartyl-L-phenylalanine, 0.5 g. L-aspartic acid, and 0.5 g. sodium chloride in 800 ml. water having a pH of 4.8 was passed over a column of 60 ml. Dowex 1-X4 in the acetate form in a 1 cm. diameter tube under conditions otherwise identical with those described in Example 1.

The liquid recovered from the column contained 22.5 g. α-APM, and 19.6 g. pure crystalline α-APM was recovered in the manner described in the preceding Examples (81.7% yield).

EXAMPLE 4

A solution of 24 g. α-APM, 1.2 g. α-AAPM, and 0.4 g. sodium chloride in 2400 ml. water having a pH of 4.8 was passed over a packed column of 20 ml. of the strong-base anion exchange resin Diaion SA–20A in the acetate form at 20° C. The effluent was found to contain 23.2 g. α-APM (96.7% yield), and 20.5 g. pure α-APM crystals were recovered from the liquid (85.4% yield).

EXAMPLE 5

A solution of 24 g. α-APM and 1.2 g. α-AAPM in a mixture of 2280 ml. water and 120 ml. methanol was treated as in Example 4. 23.0 g. α-APM was found in the effluent (95.5%) and 20.0 g. pure, crystalline α-APM was recovered (83.4%).

EXAMPLE 6

A solution of 24 g. α - L - aspartyl-L-phenylalanine ethyl ester and 1.2 g. α-L-aspartyl-α-L-aspartyl-L-phenylalanine ethyl ester in 1200 ml. water having a pH of 5.0 was passed over the resin column described in Example 1 at 50° C., and 22.7 g. α-L-aspartyl-L-phenylalanine ethyl ester (94.6%) was found in the liquid discharged from the resin column. 19.3 g. Pure α-L-aspartyl-L-phenylalanine ethyl ester was recovered from the liquid as in Example 1 (80.5%).

EXAMPLE 7

A solution of 24 g. α-APM and 1.2 g. α-AAPM in 1200 ml. water having a pH of 5.0 was passed over a column of 40 ml. Dowex 1-X4 in the formate form at 50° C., and the resin thereafter was washed with water. The liquid effluent was found to contain 22.3 g. α-APM (93.0%) and 19.5 g. pure, crystalline α-APM was recovered by partly evaporating the liquid and cooling the concentrate.

EXAMPLE 8

A solution of 24 g. α-APM, 1.2 g. α-AAPM, and 1.2 g. cyclo-α-L-aspartyl-L-phenylalanyl in 1200 ml. water at pH 5.2 was treated with ion exchange resin as in Example 1. The effluent was found to contain 22.8 g. α-APM (95.1%), but to be free of compounds giving the positive potassium iodide-starch reaction, typical of cyclo-α-L-aspartyl-L-phenylalanyl.

The partly evaporated liquid yielded 19.9 g. pure, crystalline α-APM.

EXAMPLE 9

For comparison purposes, a 1 cm. glass tube was packed with 20 ml. Amberlite IR–45 in the OH form, a representative weak-base anion exchange resin of the polystyrene-polyamine type. A solution of 5 g. α-APM and 0.5 g. α-AAPM in 200 ml. water was passed through the tube at 35° C., and the resin was then washed with 100 ml. water.

The combined effluent was analyzed for its nitrogen content by Kjeldahl's method, by electrophoresis for compounds capable of giving a ninhydrin reaction, and by thin-layer chromatography for cyclo-α-L-aspartyl-phenylalanyl. The recovered total nitrogen amounted to 70% of that in the original solution, and the recovered nitrogen was present as α-APM to the extent of 32%, L-aspartyl-L-phenylalanine 36%, and cyclo-aspartyl-phenylalanyl 32%.

The propyl and butyl esters of α-L-aspartyl-L-phenylalanine may be purified of the corresponding tripeptide esters and other peptide impurities in the same manner as described above with reference to the methyl and ethyl esters which are of greatest economical significance at this time. Esters of higher alcohols are unsuited as sweeteners.

The aqueous effluent from the resin column or a concentrate thereof may be employed as a liquid sweetener, or it may be worked up as described in the Examples to yield the crystalline esters.

What is claimed is:

1. A method of purifying α-L-aspartyl-L-phenylalanine lower alkyl esters of at least one accompanying peptide impurity selected from the group consisting of L-aspartyl-α - L - aspartyl - L - phenylalanine lower alkyl esters, L-aspartyl - α - L-aspartyl-L-phenylalanine, L-aspartyl-L-phenylalanine, and cyclo-L-aspartyl-L-phenylalanyl, which comprises:

(a) contacting an aqueous solution of said contaminated α-L-aspartyl-L-phenylalanine lower alkyl ester with a strong-base anion exchange resin at pH 4.0 to 6.0, said resin being in the weak organic acid ion form, until said impurity is retained by said resin; and (b) separating the solution so purified from said resin.

2. A method as set forth in claim 1, wherein said weak organic acid is acetic acid or formic acid.

3. A method as set forth in claim 1, wherein said impurity is α-L-aspartyl-α-L-aspartyl-L-phenylalanine lower alkyl ester.

4. A method as set forth in claim 1, wherein said L-aspartyl-L-phenylalanine lower alkyl ester is recovered from said separated solution.

5. A method as set forth in claim 1, wherein the lower alkyl group in said esters has one to four carbon atoms.

References Cited

UNITED STATES PATENTS

| 3,678,026 | 7/1972 | Ariyoshi et al. | 260—112.5 |
| 3,714,139 | 1/1973 | Schlatter | 260—112.5 |

LEWIS GOTTS, Primary Examiner

R. J. SUYAT, Assistant Examiner